(12) United States Patent
Ruckman

(10) Patent No.: US 12,623,848 B2
(45) Date of Patent: May 12, 2026

(54) SYSTEM, APPARATUS, AND METHOD FOR MOBILE REFUSE SORTING STATION

(71) Applicant: L&R, LLC, Reno, NV (US)

(72) Inventor: Derek Ruckman, Reno, NV (US)

(73) Assignee: L&R, LLC, Reno, NV (US)

( * ) Notice: Subject to any disclaimer, the term of this patent is extended or adjusted under 35 U.S.C. 154(b) by 128 days.

(21) Appl. No.: 18/495,313

(22) Filed: Oct. 26, 2023

(65) Prior Publication Data

US 2024/0140717 A1 May 2, 2024

Related U.S. Application Data

(60) Provisional application No. 63/419,771, filed on Oct. 27, 2022.

(51) Int. Cl.
*B65G 15/22* (2006.01)
*B07C 7/04* (2006.01)

(52) U.S. Cl.
CPC ............... *B65G 15/22* (2013.01); *B07C 7/04* (2013.01); *B07C 2501/0054* (2013.01)

(58) Field of Classification Search
None
See application file for complete search history.

(56) References Cited

U.S. PATENT DOCUMENTS

| | | | | |
|---|---|---|---|---|
| 5,366,165 A | * | 11/1994 | Jackman | B09B 3/35 241/24.19 |
| 5,514,399 A | * | 5/1996 | Cordera | A21D 13/24 222/413 |
| 5,979,804 A | * | 11/1999 | Abrams | B02C 19/0093 241/606 |
| 8,671,537 B2 | * | 3/2014 | Ming | B09B 3/35 29/793 |
| 11,278,913 B1 | * | 3/2022 | Adams | B03B 9/061 |
| 11,833,546 B2 | * | 12/2023 | Ragnarsson | B07B 13/16 |

* cited by examiner

*Primary Examiner* — Kavel Singh
(74) *Attorney, Agent, or Firm* — Nixon Peabody LLP

(57) ABSTRACT

A device for sorting waste includes: a first conveyance module including a first conveyor belt movably mounted thereon, the first conveyance module include a hopper disposed at a first end of the first conveyor belt, the hopper being configured to receive waste; a second conveyance module including a second conveyor belt movably mounted thereon, the second conveyance module being coupled to the first conveyance module such that a first end of the second conveyor belt is positioned adjacent to a second end of the first conveyor belt; a first drain pan disposed underneath the first end of the first conveyor belt and aligned with the hopper; and a second drain pan disposed underneath the second end of the first conveyor belt and the first end of the second conveyor belt.

20 Claims, 12 Drawing Sheets

SYSTEM, APPARATUS, AND METHOD FOR MOBILE REFUSE SORTING STATION

CROSS-REFERENCE TO RELATED APPLICATIONS

This application claims priority to and the benefit of U.S. Provisional Application No. 63/419,771, filed on Oct. 27, 2022, which is hereby incorporated by reference herein in its entirety.

FIELD OF THE INVENTION

The present disclosure relates generally to on-site solid waste and recyclable materials management. More particularly, the present disclosure related to a material sorting machine that includes one or more conveyor belts that can be positioned at a variety of different angles.

BACKGROUND OF THE INVENTION

A problem exists in the in the recycling-reclamation industry in that it is difficult to remove non-biodegradable, non-acceptable, and other identifiable contamination from composting and recyclable materials prior to sending the composted material offsite for final processing and use. When unable to remove the contaminates and recyclables from compostable material, the entire load becomes unusable and must be sent to a landfill. Besides the lost use of the materials, there is environmental and financial waste associated with the cost of landfilling recyclable materials and compost.

This problem is uniquely manifested at large events such as outdoor concerts and sporting events in stadiums and arenas. Receptacle separation and hand sorting proved to be inefficient and inconsistent as a solution to this problem.

Sorting facilities (known as Material Recovery Facilities or "MRFs") are conventionally handled off-site at large, dedicated facilities frequently owned by companies or entities that often also own landfills. As a result, there is often an economic incentive to landfill the materials without sorting, let alone optimally sorting, the recyclables out of the materials properly destined for landfills. As result of landfilling being a more lucrative endeavor, there is an ongoing and inherent conflict-of-interest against a high-quality recycling process.

Many of the MRFs are located off-site where compacted material arrives in the least optimal condition for sorting equipment. Compaction rates of material in collection vehicles can drastically impact the amount of residuals generated ("residuals" are materials that are rejected as non-recyclable at MRFs).

The goal of these large MRFs is to maximize throughput, not careful recycling; thus, processed materials have significant percentages of residuals. Often, residual percentages are not regulated or a permitted condition of operating for these facilities.

The present disclosure is related to systems and methods for facilitating the receiving, separating, and preparing of recyclable materials for end-user markets, and/or for sorting recyclable material into the appropriate sorted commodities (paper, cardboard, metal, plastic, glass, etc.). All these and other objects of the present disclosure will be understood through the detailed description below.

SUMMARY OF THE INVENTION

The present invention is directed to a device for sorting waste material. The device includes a first conveyance module, a second conveyance module, a first drain pan, and a second drain pan. The first conveyance module includes a first conveyor belt movably mounted thereon, which has a first end and an opposing second end. The first conveyance module includes a hopper disposed at the first end of the first conveyor belt, which is configured to receive the waste material. The second conveyance module includes a second conveyor belt movably mounted thereon, which has a first end and an opposing second end. The second conveyance module is coupled to the first conveyance module such that the first end of the second conveyor belt is positioned adjacent to the second end of the first conveyor belt. The first drain pan is disposed underneath the first end of the first conveyor belt and aligned with the hopper. The second drain pan is disposed underneath the second end of the first conveyor belt and the first end of the second conveyor belt.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The present invention will be described with greater specificity and clarity with reference to the following drawings, in which.

Figure 1A:
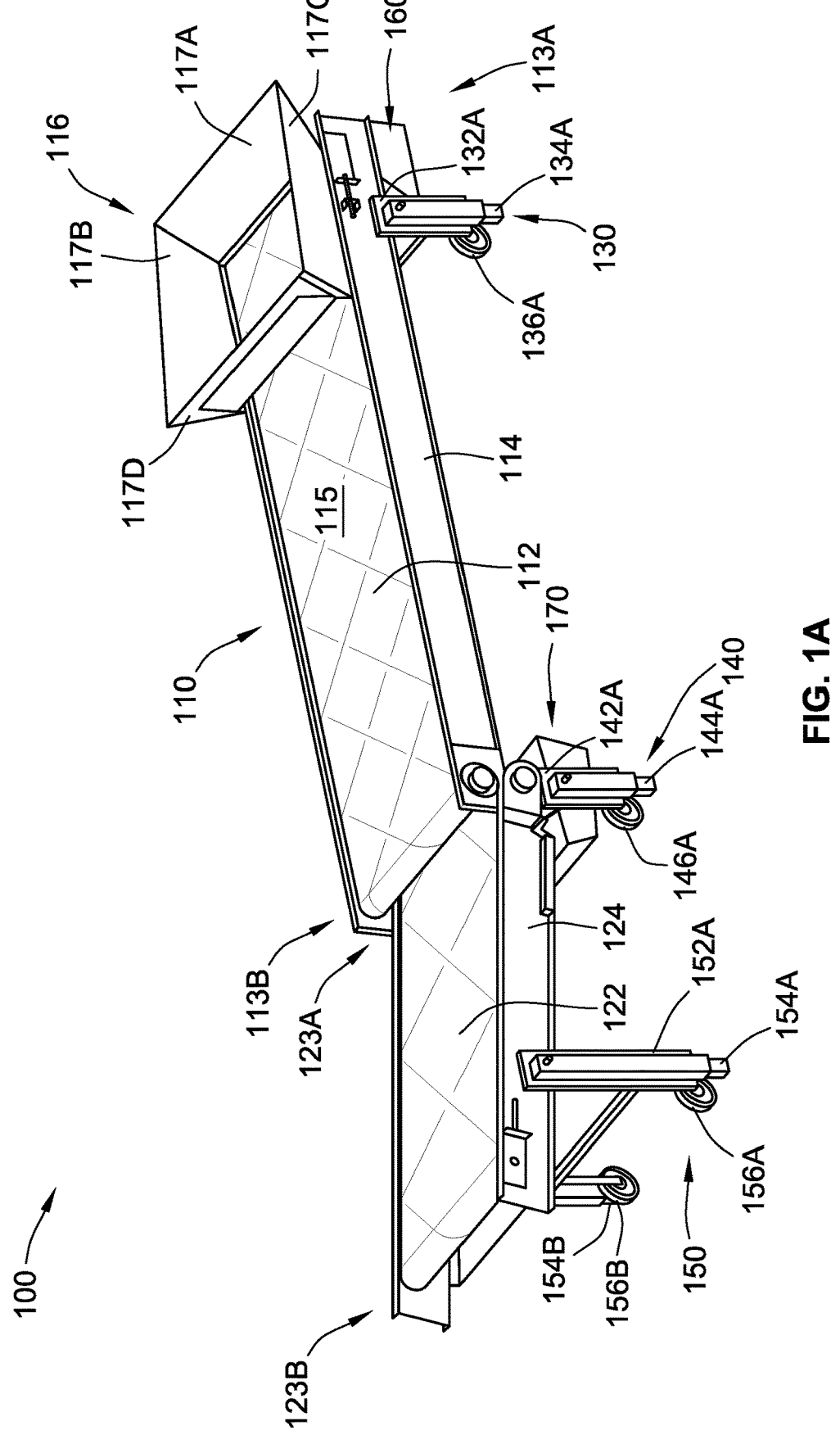
FIG. 1A is a first perspective view of a device for sorting waste material, according to aspects of the present disclosure.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Figure 1B:
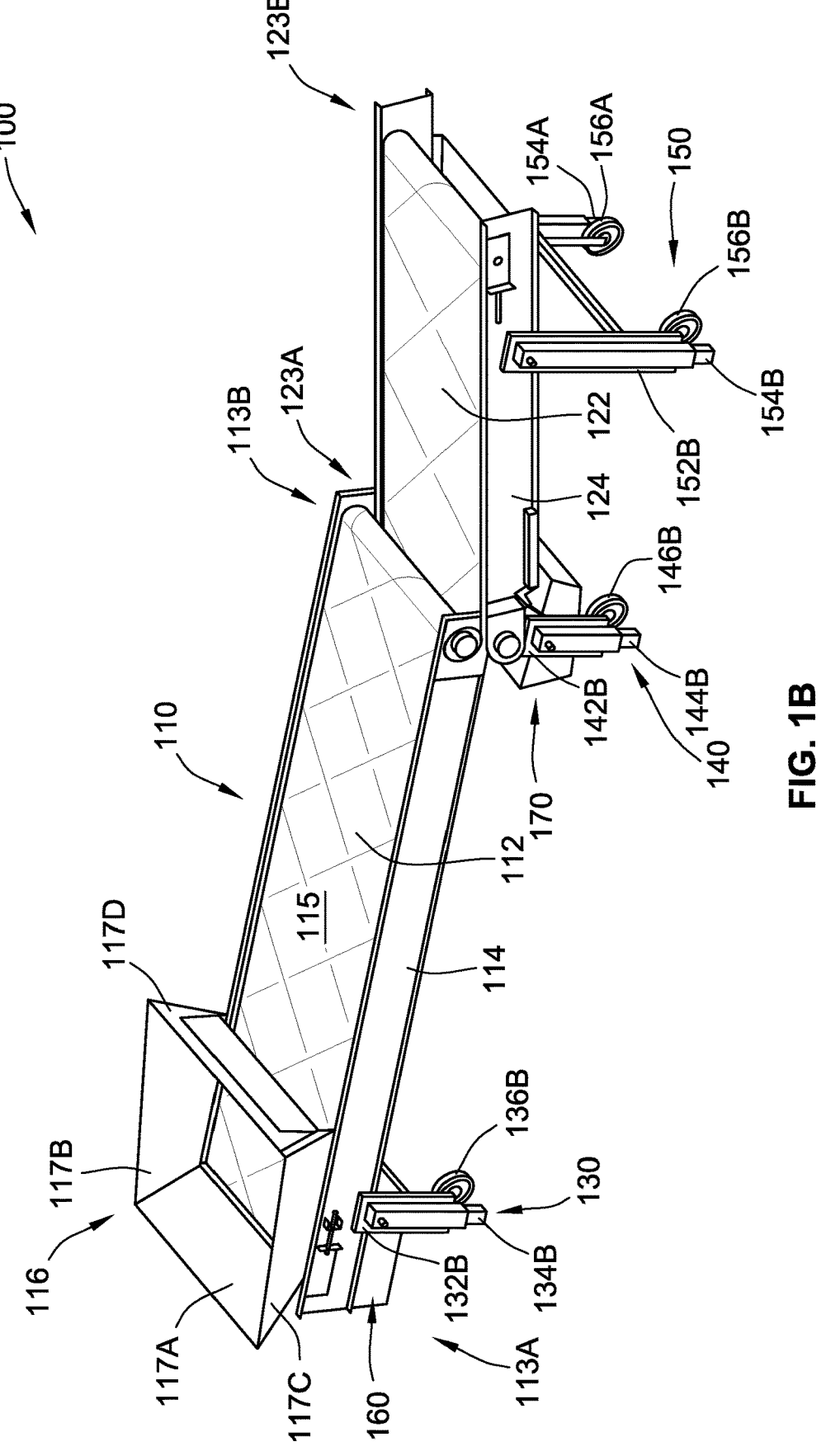
FIG. 1B is a second perspective view of the device of FIG. 1A, according to aspects of the present disclosure.

FIG. 1A and FIG. 1B show a waste sorting device 100 that can be used for sorting waste material. The device 100 can be deployed, for example, at sports stadiums or other event venues, and can be used during the sorting of waste that has been collected. For example, the device 100 can be used to separate liquids (e.g., water, soda, beer, etc.), solid and/or semi-solid food waste, and non-food waste (such as paper, cardboard, glass, etc.). The device 100 can be deployed in other locations as well, such as commercial office buildings, multi-family residences (e.g., apartment buildings, condo buildings, townhomes, etc.), single-family residences, parks, and generally any waste-generating entity and/or location. The device 100 is also mounted on casters, so that it can be easily moved to a required site, moved to different locations at the site, etc.

The device 100 includes a first conveyance module 110 and a second conveyance module 120. The first conveyance module 110 includes a first conveyor belt 112 that is movably mounted on a frame 114 via a plurality of rollers (not visible in FIGS. 1A and 1B). The rollers are operable to cause the top and bottom surfaces of the first conveyor belt 112 to move translationally between the rollers. The second conveyance module 120 has generally the same structure as the first conveyance module 110, and includes a second conveyor belt 122 that is movable mounted on a frame 124 via a plurality of rollers. The rollers are operable to cause the top and bottom surfaces of the second conveyor belt 122 to move translationally between the rollers.

As will be discussed in more detail herein, waste can be placed onto the first conveyor belt 112 and the second conveyor belt 122. As the conveyor belts 112 and 122 move, the waste moves from a first end 113A of the first conveyor belt 112 to an opposing second end 113B of the first conveyor belt 112, and from a first end 123A of the second conveyor belt 122 to an opposing second end 123B of the second conveyor belt 122. As shown, the first conveyance module 110 and the second conveyance module 120 are position so that the second end 113B of the first conveyor belt 112 is located right next to the first end 123A of the second conveyor belt 122, so that waste can travel directly from the first conveyor belt 112 to the second conveyor belt 122. The respective ends of the conveyor belts 112 and 122 generally correspond to the same respective ends of the frames 114 and 124, and of the conveyance modules 110 and 120 as a whole. As the waste moves, workers stationed on either side of the conveyance modules 110 and 120 are able to sort the waste.

The first conveyance module 110 further includes a hopper 116 that is disposed at the first end 113A of the first conveyor belt 112. The hopper 116 includes a front wall 117A, a first side wall 117B, an opposing second side wall 117C, and a back wall 117D, some or all of which may be coupled to the frame 114. The walls of the hopper 116 define an interior space into which the waste can initially be placed. The front wall 117A can generally be positioned in contact with or in close proximity to the front edge of the first conveyor belt 112, the first side wall 117B can be positioned in contact with or in close proximity to a first side edge of the first conveyor belt 112 at the first end 113A thereof, and the second side wall 117C can be positioned in contact with or in close proximity to a second side edge of the first conveyor belt 112 at the first end 113A thereof. The bottom edges of these three walls can be positioned on the outside of the front and side edges of the first conveyor belt 112, generally aligned with the front and side edges of the first conveyor belt 112, or on the inside of the front and side edges of the first conveyor belt 112.

The back wall 117D extends between the side walls 117B, 117C and is spaced apart from the front wall 117A. The back wall 117D does not extend all the way down to a top surface 115 of the first conveyor belt 112. Instead, the bottom edge of the back wall 117D is spaced apart from and positioned above the first conveyor belt 112, such that a gap is formed between the top surface 115 of the first conveyor belt 112 and the bottom edge of the back wall 117D. During operation, waste can pass through this gap from the hopper 116 toward the second conveyance module 120. In some implementations, the hopper 116 is formed so that the gap has a desired height, which may generally be less than or equal to six inches. Thus, one example device 100 could have a gap of 2 inches, while another example device 100 could have a gap of 6 inches. In other implementations, the gap may be adjustable. For example, the gap formed by the hopper 116 of an example device 100 could initially be set to 2 inches for one application, and at a later time, the gap of the same example device 100 can be set to 6 inches for a different application. The varying gap sizes, which can be selected by the user, allow for the device 100 to accommodate different material types.

In general, the front wall 117A, the first side wall 117B, and the second side wall 117C are positioned so as to prevent waste from leaving the hopper anywhere except for the gap between the first conveyor belt 112 and the back wall 117D. In some implementations there are small gaps between the first conveyor belt 112 and the front wall 117A, the first side wall 117B, and the second side wall 117C to allow liquid on the first conveyor belt 112 (e.g., water, soda, beer, etc.) to spill over the front and side edges of the first conveyor belt 112, so long as these gaps prevent some or all of the solid and semi-solid waste from spilling over the front and side edges of the first conveyor belt 112.

The device 100 includes multiple sets of legs that allow the angles of the first conveyance module 110 and the second conveyance module 120 to be adjusted. In the illustrated implementation, the device 100 includes a first set of legs 130 coupled to the first conveyance module 110 adjacent to the first end 113A of the first conveyor belt 112, a second set of legs 140 coupled to both (i) the first conveyance module 110 adjacent to the second end 113B of the first conveyor belt 112 and (ii) the second conveyance module 120 adjacent to the first end 123A of the second conveyor belt 122, and a third set of legs 150 coupled to the second conveyance module 120 adjacent to the second end 123B of the second conveyor belt 122. Each of the sets of legs 130, 140, and 150 include a pair of vertical support members coupled to the frame 114 of the first conveyance module 110 and/or the frame 124 of the second conveyance module 120, a pair of jacks that are each coupled to one of the vertical support members, and a pair of wheels that are each coupled to one of the vertical support members.

The first set of legs 130 includes a pair of vertical support members 132A and 132B, a pair of jacks 134A and 134B, and a pair of casters 136A and 136B. The support members 132A and 132B are coupled to the frame 114 of the first conveyance module 110. The jack 134A and the caster 136A are coupled to the support member 132A, and the jack 134B and the caster 136B are coupled to the support member 132B.

The second set of legs 140 includes a pair of vertical support members 142A and 142B, a pair of jacks 144A and 144B, and a pair of casters 146A and 146B. The support members 142A and 142B are coupled to the frame 114 of the first conveyance module 110 and the frame 124 of the second conveyance module 120. The jack 144A and the caster 146A are coupled to the support member 142A, and the jack 144B and the caster 146B are coupled to the support member 142B.

The third set of legs 150 includes a pair of vertical support members 152A and 152B, a pair of jacks 154A and 154B, and a pair of casters 156A and 156B. The support members 152A and 152B are coupled to the frame 134 of the second conveyance module 120. The jack 154A and the caster 156A are coupled to the support member 152A, and the jack 154B and the caster 156B are coupled to the support member 152B.

The jacks of each respective set of legs 130, 140, and 150 are operable to adjust the height of the respective set of legs, which raises or lowers the respective ends of the first conveyor belt 112 and/or the second conveyor belt 122. The jacks 134A and 134B of the first set of legs 130 are operable to raise and lower the first end 113A of the first conveyor belt 112 (e.g., relative to the second end 113B of the first conveyor belt 112). The jacks 144A and 144B of the second set of legs 140 are operable to raise and lower the second end 113B of the first conveyor belt 112 (e.g., relative to the first end 113A of the first conveyor belt 112) and the first end 123A of the second conveyor belt 122 (e.g., relative to the second end 123B of the second conveyor belt 122). The jacks 154A and 154B of the third set of legs 150 are operable to raise and lower the second end 123B of the second conveyor belt 122 (e.g., relative to the first end 123A of the first conveyor belt 112). When the jacks of the legs 130, 140, and 150 are in their lowest positions, the casters of the legs 130, 140, 150 contact the ground, which allows the device 100 to be easily moved.

The device 100 also includes one or more drain pans that collect liquid waste that runs off of the first conveyor belt 112 and/or the second conveyor belt 122 (e.g., water, soda, beer, etc.). In the illustrated implementation, the device 100 includes a first drain pan 160 that is located at the first end 113A of the first conveyor belt 112, and a second drain pan 170 that is located at the intersection of the second end 113B of the first conveyor belt 112 and the first end 123A of the second conveyor belt 122. The first drain pan 160 can be coupled to the frame 114 of the first conveyance module 110 and/or the first set of legs 130, and is generally located underneath the first end 113A of the first conveyor belt 112 and aligned with the hopper 116. The second drain pan 170 can be coupled to the frame 114 of the first conveyance module 110, the frame 124 of the second conveyance module 120, the second set of legs 150, or any combination thereof. The second drain pan 170 is generally located underneath both the second end 113B of the first conveyor belt 112, and the first end 123A of the second conveyor belt 122. Liquid that is collected in the first drain pan 160 and/or the second drain pan 170 can be used in a variety of useful applications, including anaerobic digestion, alternative fuels, and others.

Figures 2A, 2B, 2C:
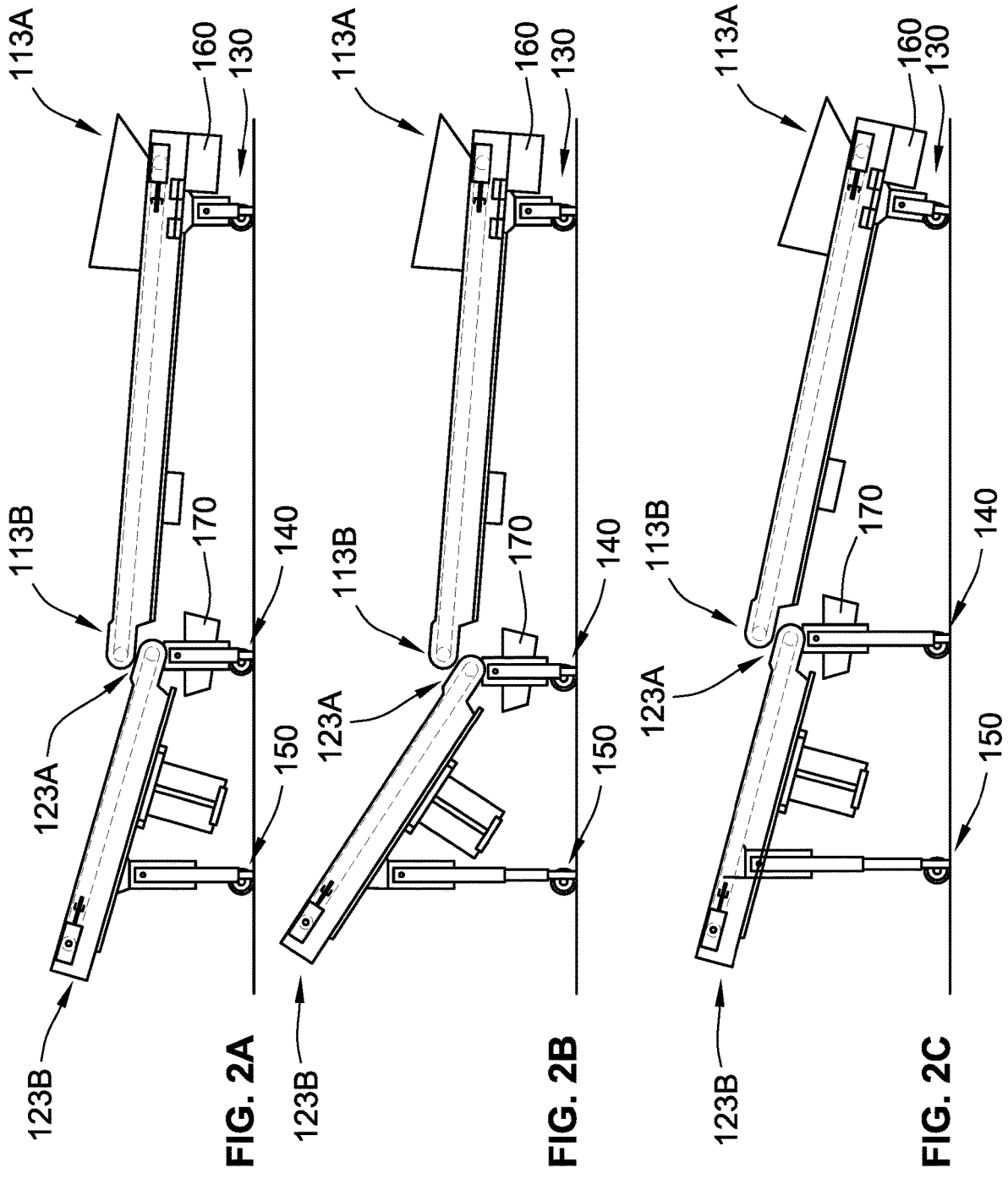
FIG. 2A is a side view of the device of FIGS. 1A and 1B arranged in a first position, according to aspects of the present disclosure.
FIG. 2B is a side view of the device of FIGS. 1A and 1B arranged in a second position, according to aspects of the present disclosure.
FIG. 2C is a side view of the device of FIGS. 1A and 1B arranged in a third position, according to aspects of the present disclosure.

Referring now to FIGS. 2A-2C, the height of the sets of legs 130, 140, and 150 can be adjusted to adjust the angle of the first conveyor belt 112 (and of the first conveyance module 110 as a whole) and the second conveyor belt 122 (and of the second conveyance module 120 as a whole). In FIG. 2A, the heights of the first set of legs 130 and the second set of legs 140 are set so that the first end 113A of the first conveyor belt 112 is lower than to the second end 113B of the first conveyor belt 112. This height difference causes at least some liquid on the surface of the first conveyor belt 112 to flow back toward the first end 113A and fall into the first drain pan 160. Similarly, the heights of the second set of legs 140 and the third set of legs 150 is set to so that the first end 123A of the second conveyor belt 122 is lower than the second end 123B of the second conveyor belt 122. This height difference causes at least some liquid on the surface of the second conveyor belt 122 to flow back toward the first end 123A and fall into the second drain pan 170.

In FIG. 2B, the heights of the first set of legs 130 and the second set of legs 140 remain the same as in FIG. 2A, but the height of the third set of legs 150 has risen so that the second end 123B of the second conveyor belt 122 is higher than in FIG. 2A. This may be done, for example, if a larger amount of gravitational force is needed to cause liquid on the second conveyor belt 122 to flow back toward the second drain pan 170. As shown, the height of the third set of legs 150 can be increased to adjust the angle of the second conveyance module 120 without affecting the angle of the first conveyance module 110.

In FIG. 2C, the height of the second set of legs 140 has been increased relative to FIG. 2A. This height increases raises the second end 113B of the first conveyor belt 112 relative to the first end 113A, which increases the angle of the first conveyor belt 112. Because the increase in height of the second set of legs 140 also raises the first end 123A of the second conveyor belt 122, the height of the third set of legs 150 can then be adjusted as needed so that the second conveyor belt 122 is positioned in the desired angle.

In general, during operation of the device 100, the first conveyor belt 112 can be positioned at any angle that results in the second end 113B being higher than the first end 113A. The first end 113A will generally be positioned at least partially underneath the hopper 116, and the second end 113B will have a vertical position that is level with or above the hopper 116 (e.g., the second end 113B will be spaced apart from and level with or above the hopper 116). Similarly, the second conveyor belt 122 can be positioned at any angle that results in the second end 123B being higher than the first end 123A. The first end 123A of the second conveyor belt 122 will be positioned level with or below the second end 113B of the first conveyor belt 112. The second end 123B of the second conveyor belt 122 will have a vertical position that is above the first end 123A (e.g., the second end 123B will be above and spaced apart from the first end 123A).

Figure 3A:
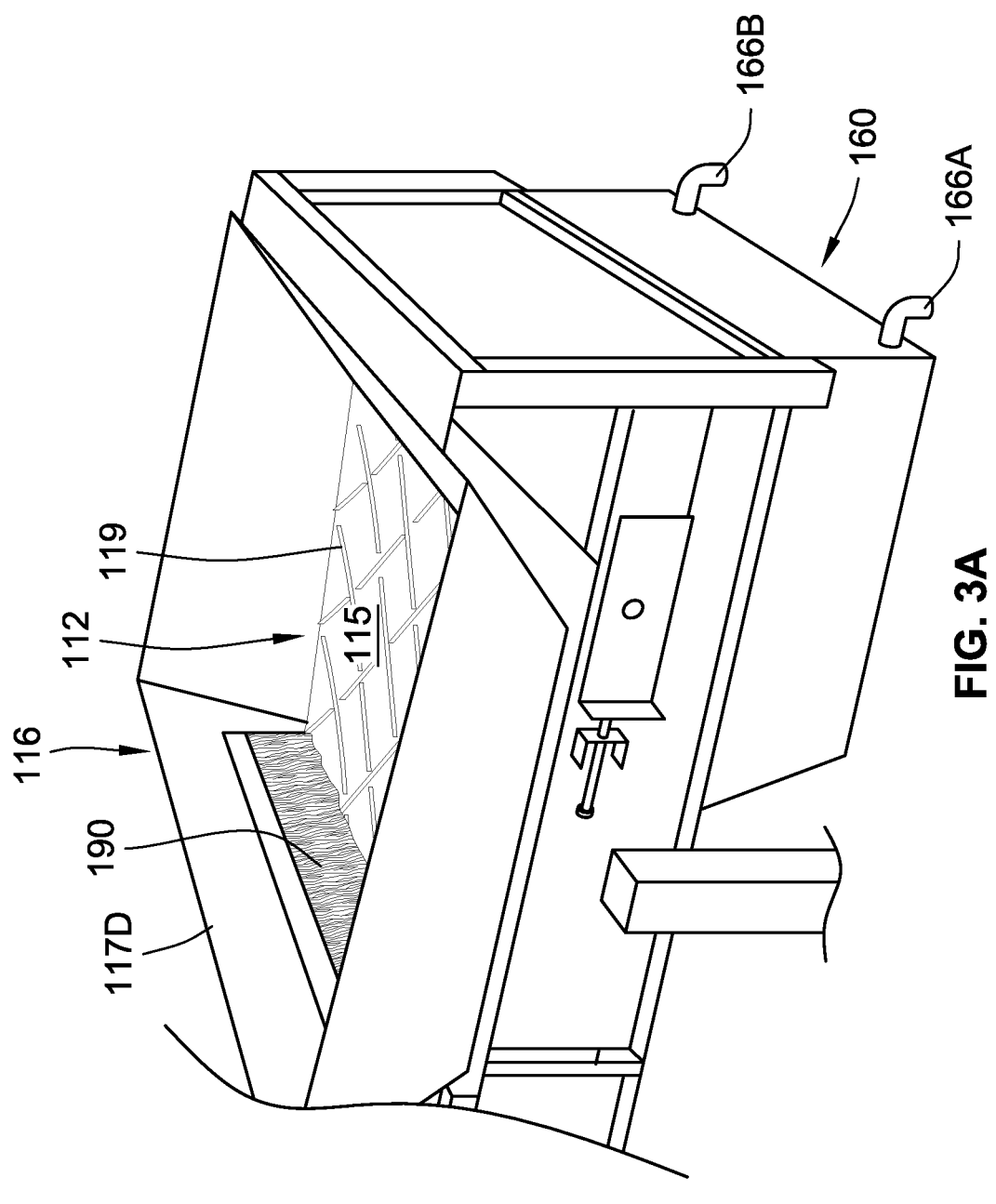
FIG. 3A is a perspective view of the device of FIGS. 1A and 1B with a first drain pan in a stowed position and a brush coupled to a hopper, according to aspects of the present disclosure.

FIG. 3A shows the first conveyor belt 112 and the hopper 116. As can be seen, the first conveyor belt 112 has a series of raised ridges 119 that are formed on the top surface 115. In the illustrated implementation, these raised ridges form a crisscross pattern (which may also be referred to as a diamond-shaped pattern, a chevron-shaped pattern, cross-hatching, cross-pleating, etc.) This pattern of raised ridges 119 directs liquid on the top surface 115 back toward the first end 111A of the first conveyor belt 112 where the first drain pan 160 is located. The raised ridges 119 can also aid in preventing liquid on the first conveyor belt 112 from spilling over the side edges of the first conveyor belt 112. The second conveyor belt 122 generally has an identical pattern of raised ridges 159 on its top surface 125, which is shown, for example, in FIG. 5. The raised ridges 119 and 129 are sized and patterned to provide sufficient friction to the solid and semi-solid waste on the angled first conveyor belt 112 and the angled second conveyor belt 122 so that the solid and semi-solid waste does not fall backwards, while still allowing for the liquid waste to flow backwards.

FIG. 3A also shows a brush 190 that is coupled to the back wall 117D of the hopper 116. The brush 190 includes a set of bristles that occupy some or all of the gap that is formed between the back wall 117D and the top surface 115 of the first conveyor belt 112. The bristles of the brush 190 extend down toward the top surface 115 of the first conveyor belt 112, and in some cases contact the top surface 115. The brush 190 can be used to knock off waste from the first conveyor belt 112 that may be stuck to the first conveyor belt 112 (e.g., is not being transferred to the second conveyor belt 122).

Figure 3B:
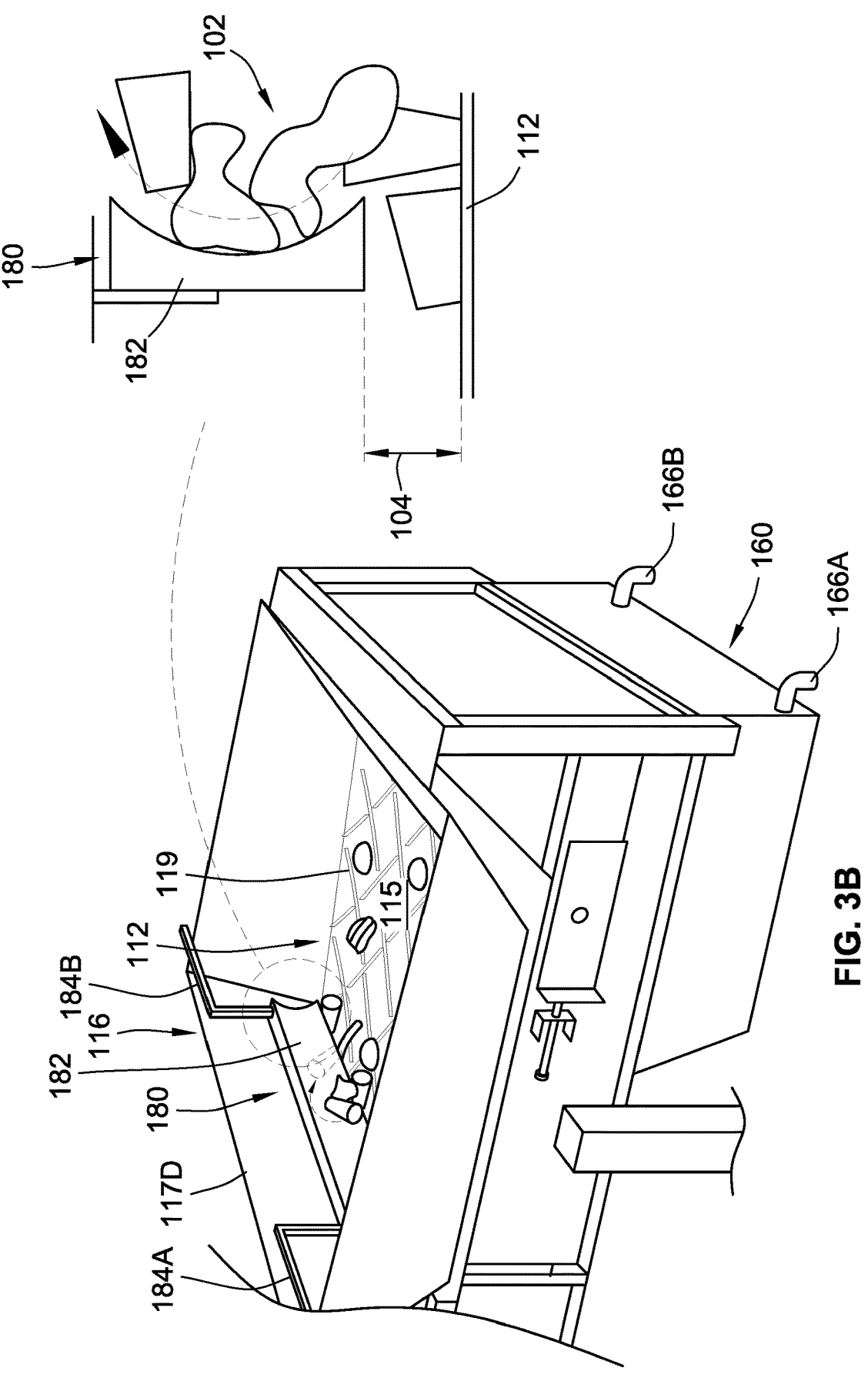
FIG. 3B is a perspective view of the device of FIGS. 1A and 1B with the first drain pan in the stowed position and a waste leveling member coupled to a hopper, according to aspects of the present disclosure.

FIG. 3B is similar to FIG. 3A, and shows the raised ridges 119 formed on the top surface 115 of the first conveyor belt 112, and the hopper 116. In FIG. 3B, the hopper 116 includes a waste leveling member 180 coupled to the back wall 117D instead of the brush 190. The waste leveling member 180 can be used to level waste on the first conveyor belt 112 as the waste moves out of the hopper 116, and to thus set the burden depth of the waste (e.g., the depth/height of material on the first conveyor belt 112 and the second conveyor belt 122).

The waste leveling member 180 has an arc-shaped body 182 and a pair of handles 184A and 184B that extend upward and outward from the body 182. The waste leveling member 180 can be coupled to the back wall 117D of the hopper 116 using a variety of different attachment mechanisms, including fasteners such as bolts, screws, clips, pins, etc.). These fasteners can be installed when the waste leveling member 180 is in place, and generally must be uninstalled to remove the waste leveling member 180. In some cases, a portion or portions of the waste leveling member 180 can slide into channels formed on the back wall 117D, which may be used in addition to or instead of the fasteners. In any case, the handles 184A and 184B can be grasped by a user to maneuver the waste leveling member 180 into place for attachment, and to remove the waste leveling member 180 from the hopper 116.

As shown in FIG. 3B, the body 182 is positioned so that the apex of the arc faces away from the front wall 117A of the hopper 116 and toward the second end 113B of the first conveyor belt 112. In this manner, the body 182 is concave with respect to waste traveling from the first end 113A of the first conveyor belt 112 to the second end 113B of the first conveyor belt 112. The body 182 can also said to be plano-concave, with the concave side facing toward the first end 113A of the first conveyor belt 112 and the planar side facing toward the second end 113B of the first conveyor belt 112.

The zoomed-in inset of FIG. 3B shows a side profile of the waste leveling member 180 as waste 102 is moved by the first conveyor belt 112. As shown, the bottom edge of the body 182 is spaced apart a distance from the first conveyor belt 112, so that a gap 104 is defined therebetween. The gap 104 sets the height of the waste 102 traveling along the first conveyor belt 112. As the waste 102 is deposited into the hopper 116 can carried by the first conveyor belt 112, some of the waste 102 will pass underneath the body 182 through the gap 104. However, any of the waste 102 that is stacked above the top of the gap 104 (e.g., above the bottom edge of the body 182) will be pushed back toward the front wall 117A of the hopper 116 by the body 182. The arc shape of the body 182 aids in pushing the higher waste backwards, as the concave surface will eject the waste further than a flat surface would. In this manner, all of the waste that exits the hopper 116 on the first conveyor belt 112 will be generally at the same level. The position of the waste leveling member 180 within the hopper 116 is set so as to achieve a desired burden depth of the waste outside of the hopper 116. In general, the desired burden depth is one that does not result in too many separate pieces of waste being stacked on top of each other, which makes it harder for the workers to efficiently sort the waste as it travels down the first conveyor belt 112 and the second conveyor belt 122.

In some implementations, the device 100 may include only the waste leveling member 180 or only the brush 190. In other implementations, the device 100 includes both the waste leveling member 180 and the brush 190. In some of these implementations, the waste leveling member 180 and the brush 190 may both be coupled to the back wall 117D of the hopper 116, within the interior space of the hopper 116. In others of these implementations, the waste leveling member 180 can be located within the interior space of the hopper 116 while the brush 190 is coupled to the underside of the back wall 117D. In some implementations with both the waste leveling member 180 and the brush 190, the bottom edges thereof may extend the same distance toward the first conveyor belt 112, or one of the waste leveling member 180 or the brush 190 can extend closer to the first conveyor belt 112 than the other. The waste leveling member 180 and/or the brush 190 can also be used to set the maximum acceptable height of any single piece of waste deposited into the hopper 116 (e.g., the burden depth of the waste). By setting the waste leveling member 180 and/or the brush 190 to a desired distance above the top surface 115 of the first conveyor belt 112, any waste that is taller than this distance will not be allowed to exit the hopper 116 and travel along the first conveyor belt 112 and the second conveyor belt 122.

Figure 4:
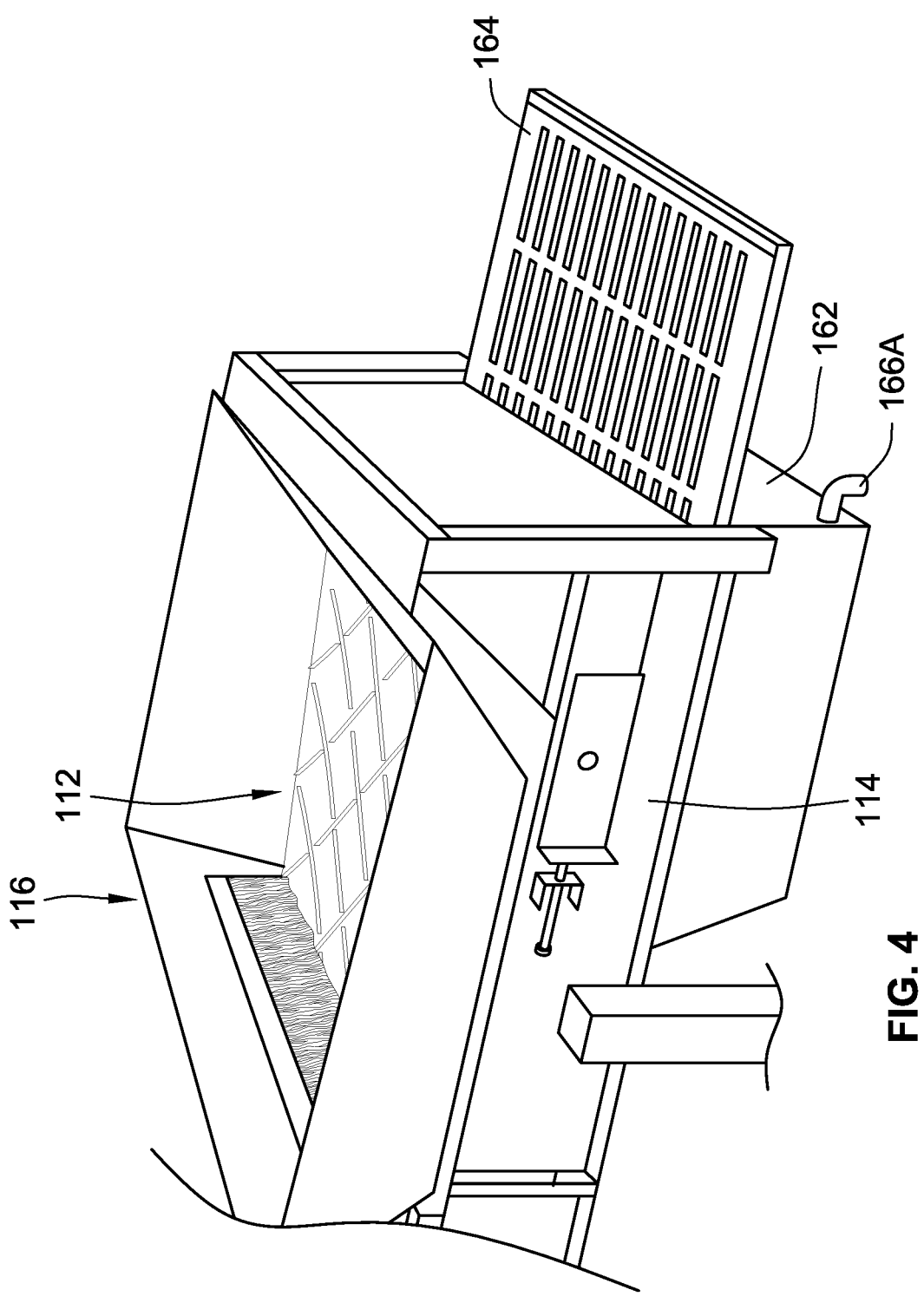
FIG. 4 is a perspective view of the device of FIGS. 1A and 1B with the first drain pan in an extended position, according to aspects of the present disclosure.

FIGS. 3A and 3B also show the first drain pan 160 that is coupled to the frame 114 of the first conveyance module 110 and/or to the first set of legs 140. FIG. 4 shows the first drain pan 160 when a grate 164 of the first drain pan 160 has been moved to an extended position. Referring generally to FIGS. 3A, 3B, and 4, the first drain pan 160 includes a liquid container 162 and the grate 164 that is slidably mounted on top of the liquid container 162. The first drain pan 160 can also include drain ports 168A and 168B that are defined in the liquid container 162. The drain ports 168A and 168B can allow for collected liquid to be drained out of the liquid container 162 without having to remove the entire first drain pan 160 from the device 100.

In FIGS. 3A and 3B, the first drain pan 160 coupled when the grate 164 (not visible in FIGS. 3A and 3B) is in a stowed position. The first drain pan 160 may be coupled to the first conveyance module 110 (e.g., to the frame 114 of the first conveyance module 110) and/or to the first set of legs 130. Both the liquid container 162 and the grate 164 are positioned underneath the front edge of the first conveyor belt 112 and aligned with the hopper 116, so that liquid on the first conveyor belt 112 that falls off the front edge will fall into the liquid container 162, and solid or semi-solid waste will fall onto the grate 164. FIGS. 3A and 3B also show the drain ports 168A and 168B that allow liquid in the liquid container 162 to be removed without having to detach the first drain pan 160 from the device 100. While FIGS. 3A and 3B illustrate two drain ports 168A and 168B, other implementations of the first drain pan 160 can have a single drain port, or three or more drain ports.

In FIG. 4, the grate 164 has been moved to the extended position. In the extended position, the grate 164 extends outward from the front edge of the first conveyor belt 112 and the hopper 116, so that the grate 164 is no longer aligned with the hopper 116. The grate 164 in the extended position is thus easily accessible and any solid or semi-solid waste on the grate 164 can easily be removed.

In the implementation illustrated in FIGS. 3A, 3B, and 4, the liquid container 162 is stationary and only the grate 164 moves. In other implementations however, the first drain pan 160 itself may be slidably coupled to the first conveyance module 110 (e.g., to the frame 114 of the first conveyance module 110) and/or to the first set of legs 130. In these implementations, the liquid container 162 itself is slidably coupled and can be moved between a stowed position and an extended position. In the stowed position, the liquid container 162 will be in generally the same position as the liquid container 162 in FIGS. 3A and 3B, underneath the front edge of the first conveyor belt 112 and aligned with the hopper 116. In the extended position, the liquid container 162 and the grate 164 will extend outward from the front edge of the first conveyor belt 112 and the hopper 116 so that the liquid container 162 and the grate 164 are no longer aligned with the hopper 116, and the grate 164 is accessible.

While the raised ridges 119 of the first conveyor belt 112 will generally keep most of (if not all) of the liquid on the first conveyor belt 112 from spilling over the side edges, the frame 114 can catch liquid that does spill over the side edges. The underside of the frame 114 is solid and generally encloses the sides and underside of the first conveyor belt 112. Liquid that spills over the side edges of the first conveyor belt 112 that does not fall directly into the first drain pan 160 will generally fall onto the interior surface of the bottom of the frame 114. Because the frame 114 will be positioned at an angle, the liquid on this interior surface will flow back toward the first drain pan 160. The first drain pan 160 is positioned so that the first drain pan 160 catches any liquid flowing off of the interior surface of the frame 114, as well as liquid flowing off the back edge of the first conveyor belt 112 and/or the side edges of the first conveyor belt 112 at the first end 113A thereof.

Figure 5:
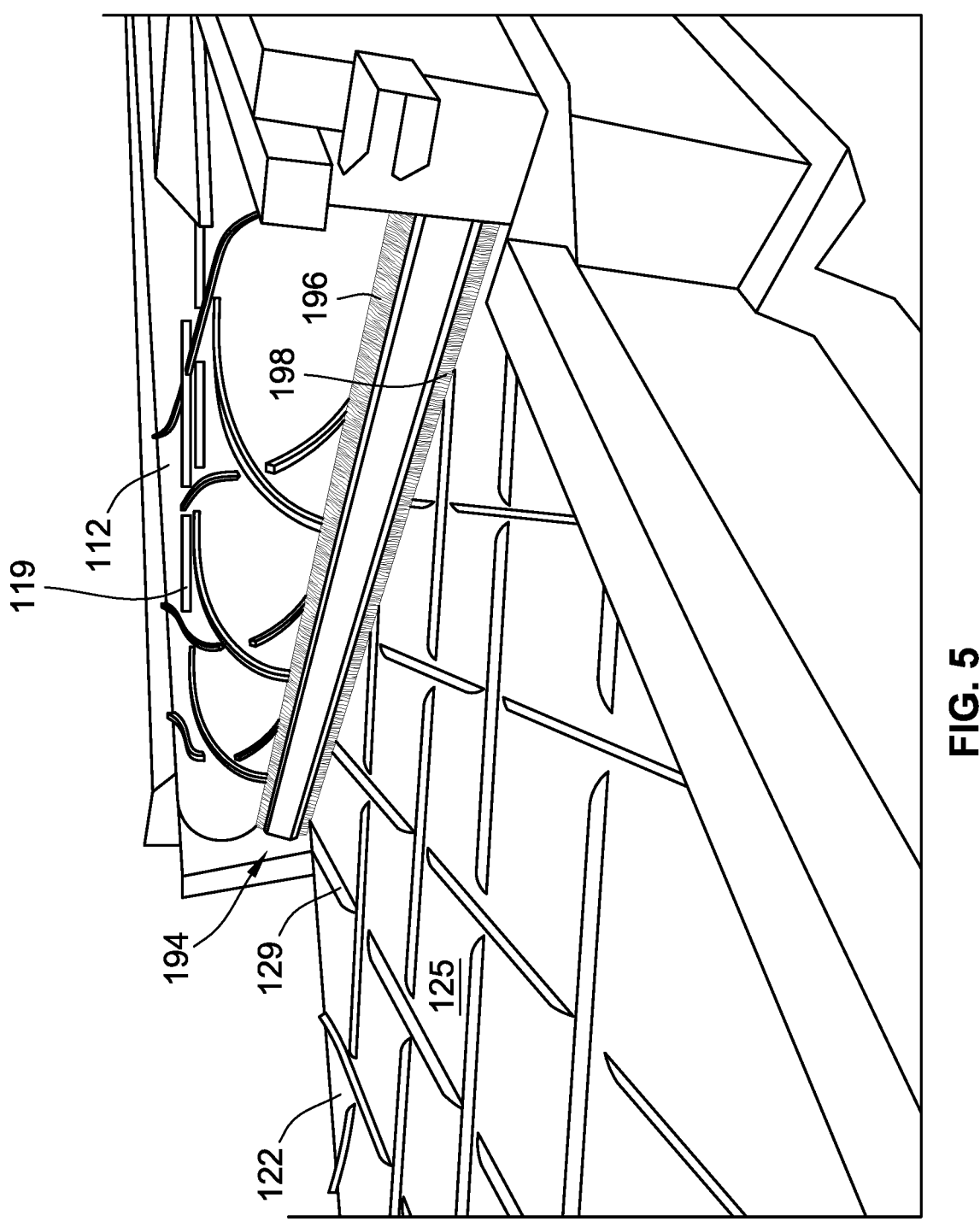
FIG. 5 is a perspective view of a brush located at the intersection between a first conveyor belt and a second conveyor belt of the device of FIGS. 1A and 1B, according to aspects of the present disclosure.

FIG. 5 shows a brush 194 that is coupled to the frame 114 of the first conveyance module 110, and also shows raised ridges 129 formed on a top surface 125 of the second conveyor belt 122. The raised ridges 129 are generally identical to the raised ridges 119 of the first conveyor belt 112, but could differ in some implementations. Because of the relative positions of the first conveyance module 110 and the second conveyance module 120, the brush 194 is generally located at both the back edge of the first conveyor belt 112 (at the second end 113B) and the front edge of the second conveyor belt 122 (at the first end 123A). The brush 194 includes a first set of bristles 196 and a second set of bristles 198. The first set of bristles 196 extends up toward the first conveyor belt 112, and in some cases contacts the bottom surface of the first conveyor belt 112. Similarly, the second set of bristles 198 extends down toward the second conveyor belt 122, and in some cases contacts the top surface 125 of the second conveyor belt 122. The bristles 196 knock off waste (generally solid and/or semi-solid waste, such as food waste) that may be stuck to the first conveyor belt 112, and the bristles 198 knock off waste (generally solid and/or semi-solid waste, such as food waste) that may be stuck to the second conveyor belt 122, similar to the bristles 192 of the brush 190.

Figure 6A:
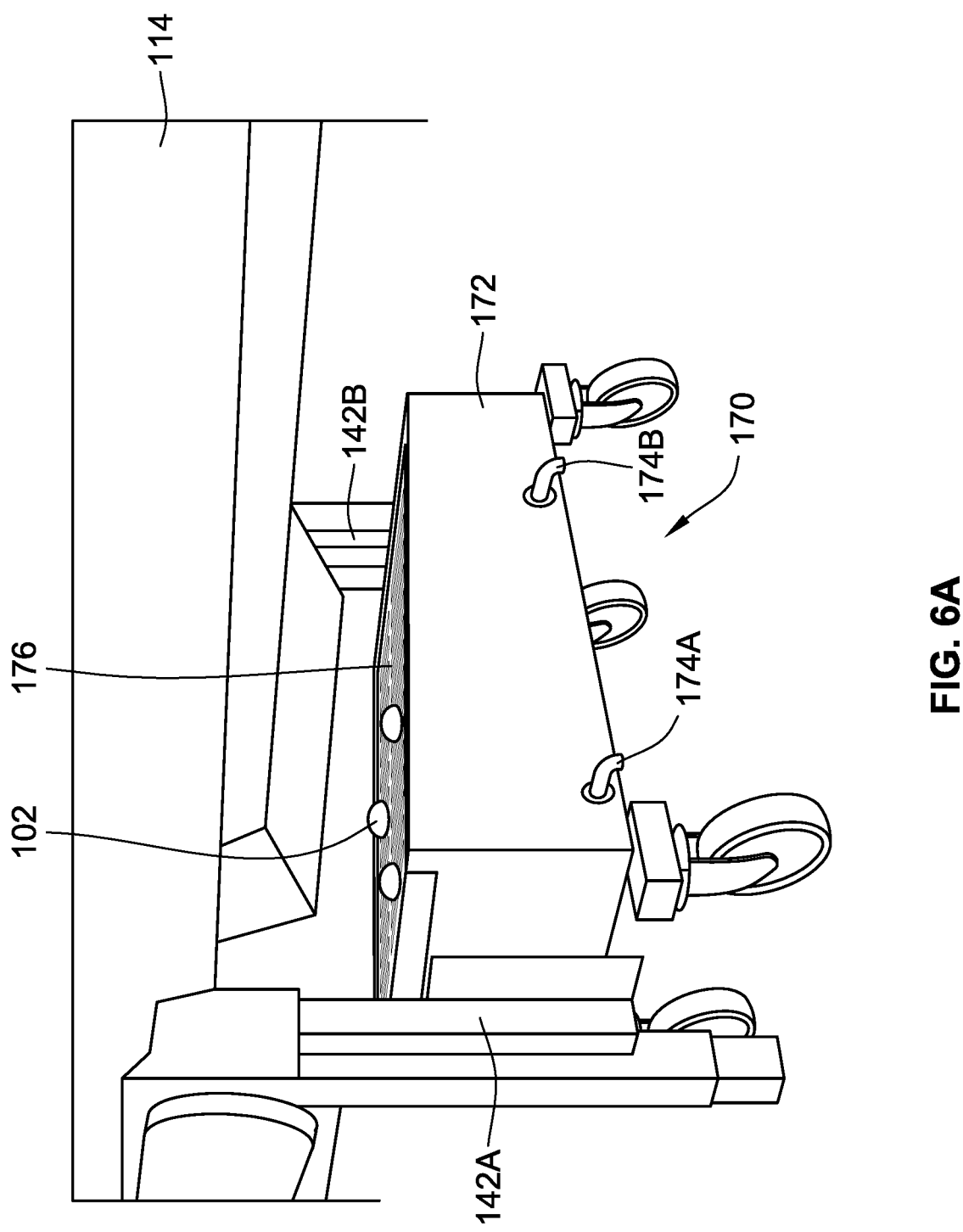
FIG. 6A is a perspective view of a first implementation of a second drain pan of the device of FIGS. 1A and 1B in a stowed position, according to aspects of the present disclosure.
Figure 6B:
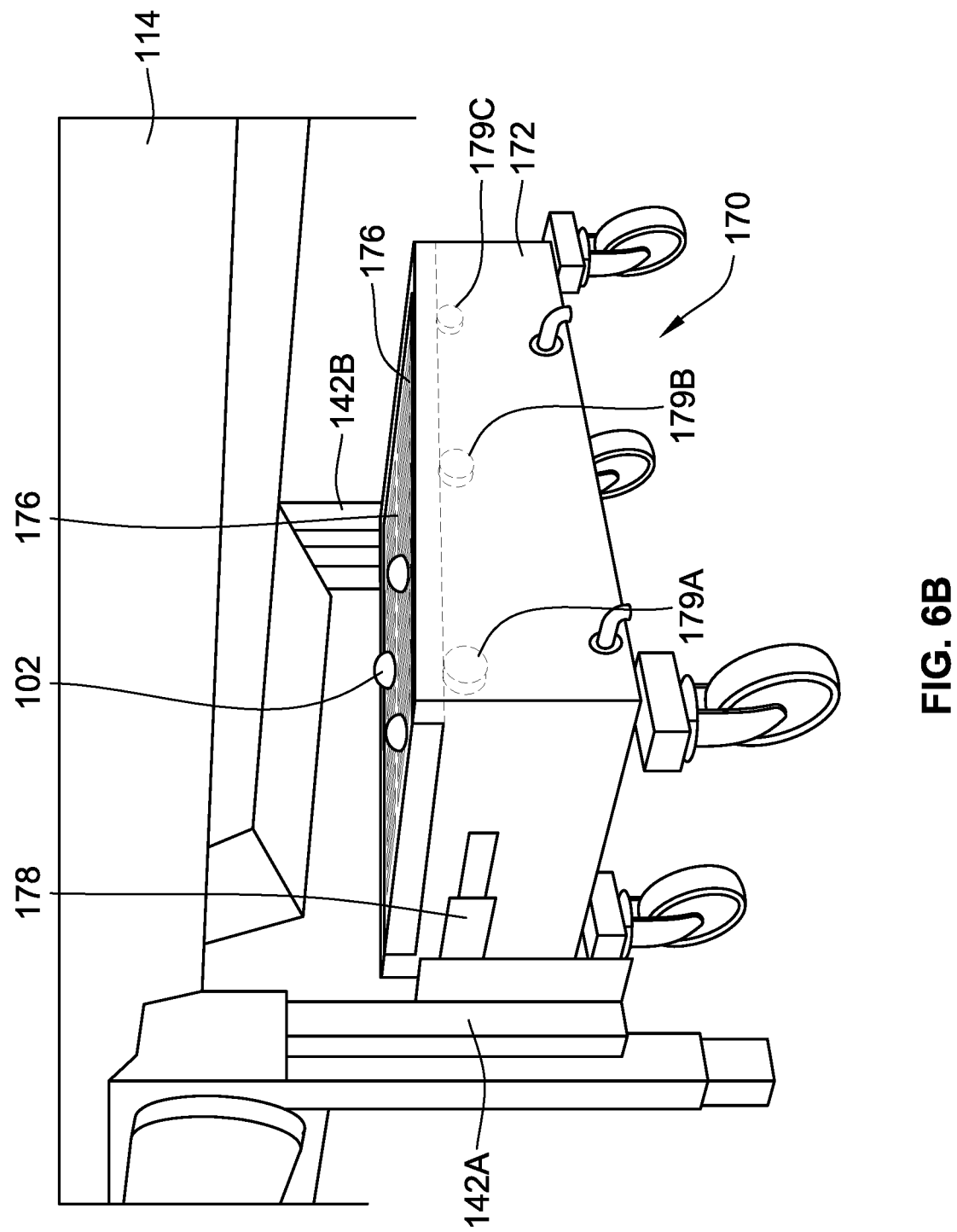
FIG. 6B is a perspective view of the second drain pan in a partially extended position, according to aspects of the present disclosure.
Figure 6C:
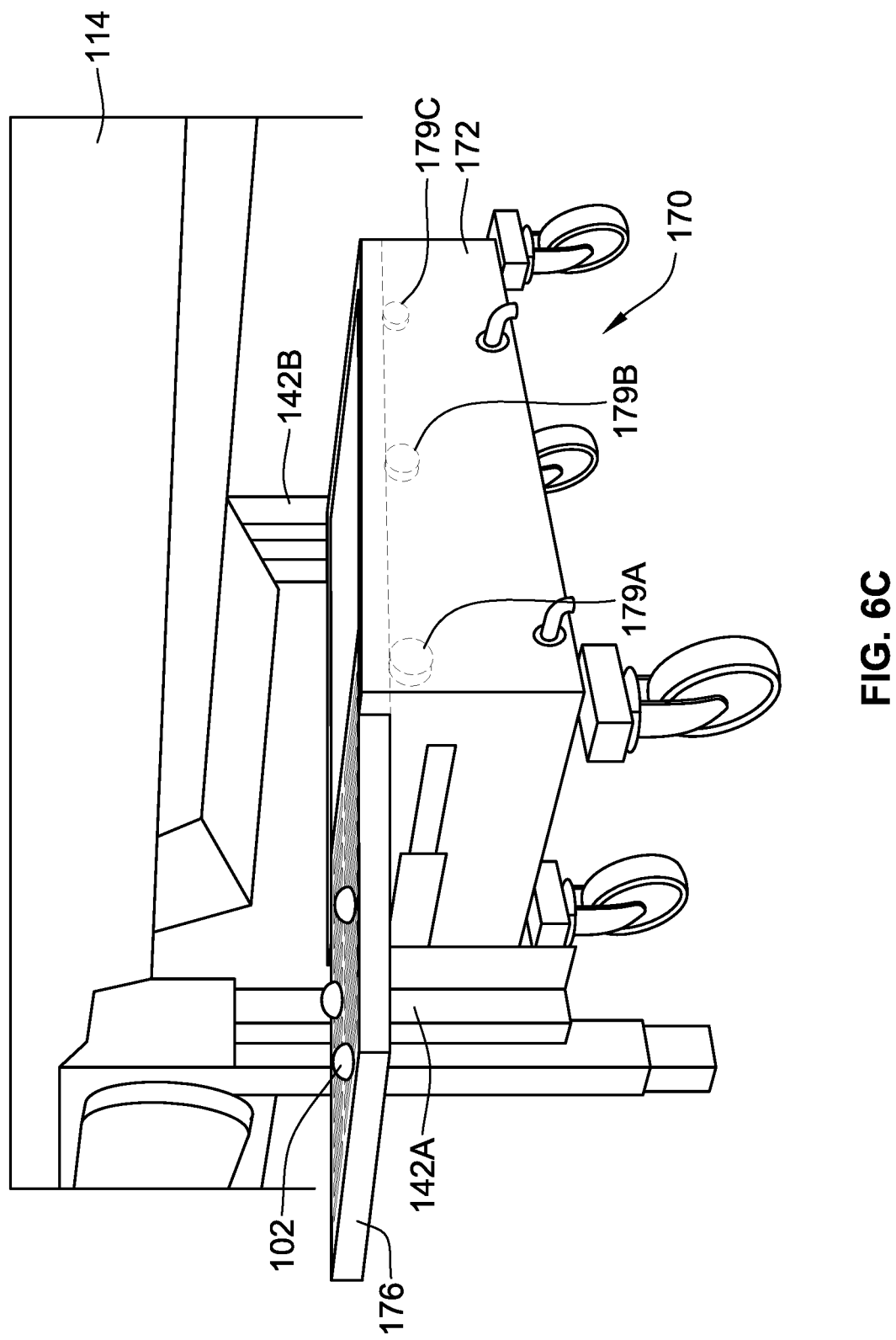
FIG. 6C is a perspective view of the second drain pan in a fully extended position, according to aspects of the present disclosure.

FIGS. 6A-6C show a first implementation of the second drain pan 170, which includes a liquid reservoir 172, drain ports 174A and 174B formed in the liquid reservoir 172, and a grate 176 positioned above the liquid reservoir 172. In the illustrated implementation, the liquid reservoir 172 is coupled to the support members 142A and 142B of the second set of legs 140. However, the liquid reservoir 172 could additionally or alternatively be coupled to the first conveyance module 110 (e.g., the frame 114) and/or the second conveyance module 120 (e.g., the frame 124). The liquid reservoir 172 is positioned underneath both the second end 113B of the first conveyor belt 112 and the first end 123A of the second conveyor belt 122. The liquid reservoir 172 catches liquid that falls off the first conveyor belt 112 and/or the second conveyor belt 122. The drain ports 174A and 174B allow liquid in the liquid reservoir 172 to be removed without having to detach the liquid reservoir 172 itself. While FIGS. 6A-6C illustrate two drain ports 174A and 174B, other implementations of the second drain pan 170 can have a single drain port, or three or more drain ports.

In FIG. 6A, the second drain pan 170 is in a stowed position. In this position, the liquid reservoir 172 and the grate 176 are generally positioned between the support members 142A and 142B of the second set of legs 140, so that they are difficult to access. In FIG. 6B, the second drain pan 170 is in a partially extended position. In the partially extended position, the liquid reservoir 172 slides away from the support members 142A and 142B along rails that slidably couple the liquid reservoir 172 to the support members 142A and 142B. In FIG. 6B, only a single rail 178 that slidably couples the liquid reservoir 172 to the support member 142A is visible. However, a generally identical rail is disposed on the opposite side of the liquid reservoir 172 and will slidably couple the liquid reservoir 172 to the support member 142B. As can be seen, the liquid reservoir 172 and the grate 176 have moved away from the support members 142A and 142B, so that the support members 142A and 142B no longer block the liquid reservoir 172 and the grate 176.

In FIG. 6C, the second drain pan 170 is in a fully extended position. In the fully extended position, the grate 176 has slide sideways relative to the movement direction of the liquid reservoir 172 from the stowed position and the partially extended position, so that the grate 176 protrudes from the side of the frame 114 of the first conveyance module 110. As shown, the second drain pan 170 includes a plurality of wheels or rollers mounted on the inside of the liquid reservoir 172 on which the grate 176 rests. FIG. 6C shows only three wheels 179A, 179B, and 179C, but the liquid reservoir 172 may include more or few wheels on that side, and/or any number of wheels on the opposite side. To move the grate 176 sideways, the edge of the grate 176 can be lifted by a user, and the grate 176 is slid along the wheels 179A-179C. The grate 176 is generally coupled to the liquid reservoir 172 such that once the grate 176 is slid out as far as it can, the user can release the grate 176 and it will not detach from the liquid reservoir 172. Thus, any waste 102 that has fallen down onto the grate 176 can easily be removed. The second drain pan 170 can then be moved back to the stowed position for further use.

Figure 7:
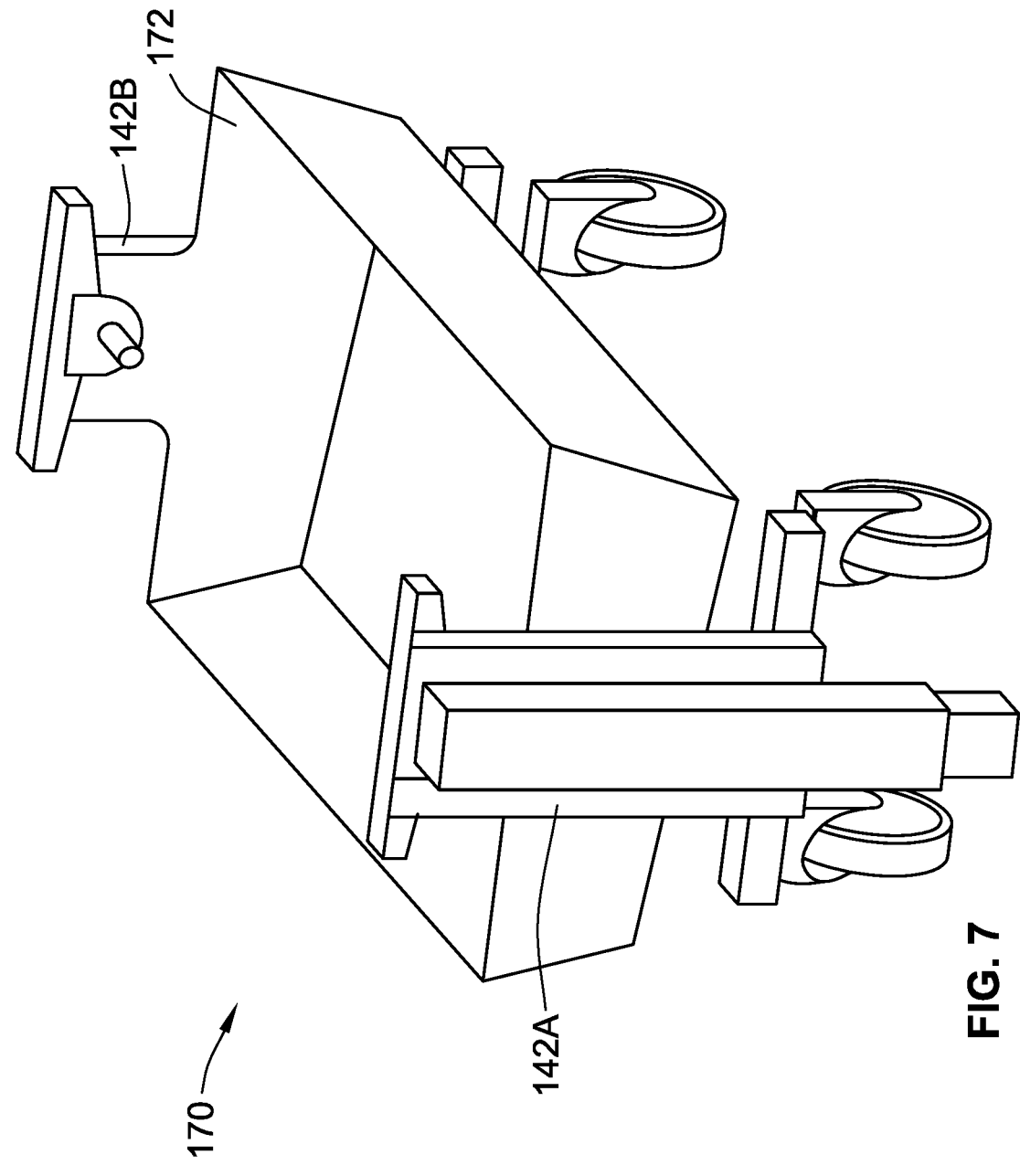
FIG. 7 is a perspective view of a second implementation of the second drain pan of FIGS. 1A and 1B, according to aspects of the present disclosure.

FIG. 7 shows a second implementation of the second drain pan 170, which generally consists of only liquid reservoir 172 coupled to the support members 142A and 142B. The liquid reservoir 172 is positioned underneath both the second end 113B of the first conveyor belt 112 and the first end 123A of the second conveyor belt 122. The liquid reservoir 172 catches liquid that falls off the first conveyor belt 112 and/or the second conveyor belt 122.

Similar to the first conveyor belt 112, while the raised ridges 129 of the second conveyor belt 122 will generally keep most of (if not all) of the liquid on the second conveyor belt 122 from spilling over the side edges, the frame 124 can catch liquid that does spill over the side edges. The underside of the frame 124 is solid and generally encloses the sides and underside of the second conveyor belt 122. Liquid that spills over the side edges of the second conveyor belt 122 that does not fall directly into the second drain pan 170 will generally fall onto the interior surface of the bottom of the frame 124. Because the frame 124 will be positioned at an angle, the liquid on this interior surface will flow back toward the second drain pan 170. The second drain pan 170 is positioned so that the second drain pan 170 catches any liquid flowing off of the interior surface of the frame 124, as well as liquid flowing off the back edge of the second conveyor belt 122 and/or the side edges of the second conveyor belt 122 at the first end 133A thereof.

Figures 8A, 8B:
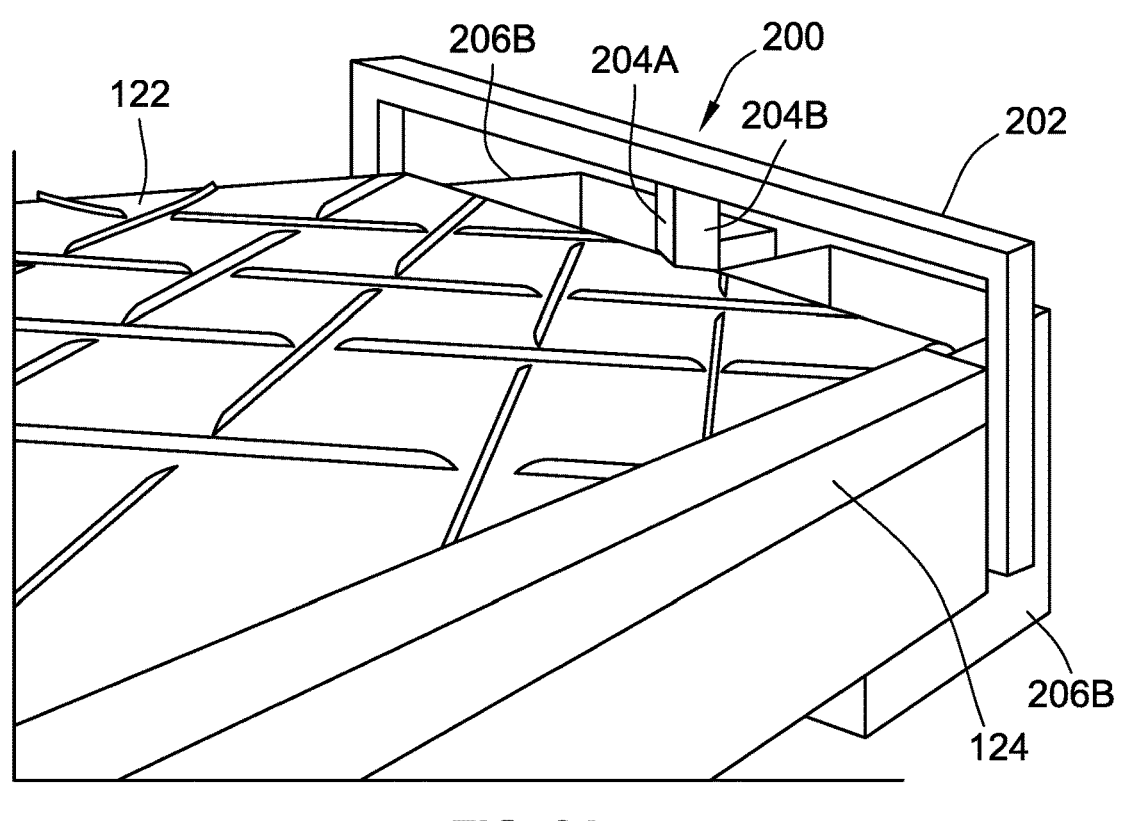
FIG. 8A is a perspective view of a waste diverter coupled to the device of FIGS. 1A and 1B, according to aspects of the present disclosure.
FIG. 8B is an overhead view of the operation of the waste diverter of FIG. 8A, according to aspects of the present disclosure.

Referring now to FIGS. 8A and 8B, the device 100 can include a waste diverter 200 mounted at the second end 123B of the second conveyance module 120. In FIGS. 8A and 8B, two separate waste bins 206A and 206B are used to collect the waste 102 on the second conveyor belt 122. However, the width of the bins 206A and 206B is such that the combined width of the two bins 206A, 206B is less than the width of the second conveyor belt 122. There will thus be some sort of gap along the width of the two bins 206A, 206B where a portion of the back edge of the second conveyor belt 122 is not aligned with one of the bins 206A, 206B, which allows for some of the waste 102 to fall off the second conveyor belt 122 into the ground.

Generally, the waste diverter 200 is coupled to the frame 124 of the second conveyance module 120, but could be coupled to the second conveyance module 120 at different locations. The waste diverter 200 includes a crossmember 202 that is coupled to the second conveyance module 120 above the second conveyor belt 122, and two angled walls 204A and 204B that extend from the crossmember 202 toward the second conveyor belt 122. The two angled walls 204A and 204B will generally be located right at the back edge of the second conveyor belt 122 or slightly forward of the back edge, and can be used to divert any of the waste 102 on the second conveyor belt 122 into one of two separate waste bins 206A and 206B. As shown in FIG. 8B, any of the waste 102 that is in the middle of the second conveyor belt 122 will contact either of the angled walls 204A and 204B and be pushed outward toward the side edges of the second conveyor belt 122 to divide the waste 102 into two groups 103A and 103B. The waste in group 103A will fall into waste bin 206A, while the waste in group 103B will fall into waste bin 206B.

The device 100 and the components thereof can have any suitable size. In some implementations, the first conveyor belt 112 has a length of between about 10 feet and about 15 feet, or of about 13 feet. The second conveyor belt 122 is generally shorter, and can have a length of between about 5 feet and about 10 feet, or of about 8 feet. In some implementations however, the first conveyor belt 112 and the second conveyor belt 122 can have the same length. The width of both the first conveyor belt 112 and the second conveyor belt 122 can be between about 2 feet and about 6 feet, or about 4 feet. The hopper 116 can have a width that is between about 40 inches and about 60 inches, between about 45 inches and about 55 inches, or about 55 inches; and can have a length that is between about 40 inches and about 60 inches, between about 45 inches and about 55 inches, or about 48 inches. The top of the hopper 116 can be located at any suitable height off the ground (e.g., between about 30 and 50 inches, about 40 inches, etc.) to allow for workers to comfortable dump waste into the hopper 116.

Moreover, the device 100 can generally be built to any dimensions or specifications that may be desired by the end user. For example, the first conveyor belt 112 and/or the second conveyor belt 122 could have a long length of about 20-30 feet in some implementations. In these implementations, the device 100 may include additional sets of legs in order to properly stabilize the first conveyor belt 112 and/or the second conveyor belt 122. For example, if the first conveyor belt 112 is built to 20 feet long, an additional set of legs may be coupled to the middle of the frame 114. These additional sets of legs may be height adjustable like legs 130, 140, 150, or could be non-height adjustable, depending on the desires of the end user.

While the illustrated implementation of device 100 shows only the first conveyor belt 112 and the second conveyor belt 122, other implementations may include additional conveyor belts or fewer conveyor belts. For example, a third conveyance module with a third conveyor belt coupled to a third frame can be coupled to the second conveyance module 120. This can extend the available length of the device 100 for workers, and increase the amount of sorting that can be done as the waste passes through the device. In another example, multiple conveyance modules could be coupled to the first conveyance module 110 and/or the second conveyance module 120. For example, a third conveyance module and a fourth conveyance module could both be coupled to the end of the second conveyance module. If there is enough width to fit both the third conveyance module and the fourth conveyance module (and the required workers), the effective length of the device 100 is increased by more than the length of the third conveyance module or the length of the fourth conveyance module.

Described below is an example method of using the device 100 and/or similar devices. First, collected waste from a venue (e.g., a stadium, arena, etc.), which is typically in garbage bags and/or other bags, is deposited into the hopper 116. The waste then encounters the waste leveling member 180 and/or the brush 190, which are used to set the burden depth of the waste exiting the hopper and/or to prevent any items to tall or large to go through the remainder of the sorting process. Workers along the first conveyor belt 112 and/or the second conveyor belt 122 perform a "negative sort" of the waste, e.g., they remove materials that do not belong in food waste, such as glass, plastic, and metal items. Any such items removed from by these workers are deposited into a tote or cart adjacent to the conveyor belts 112 and 122. Such items can be further deposited into a recycling compactor once the tote or cart is full or the sort is complete. Liquid waste is moved back or to the sides by the angle of the conveyor belts 112 and 122 and the raised ridges 119 and 129 thereon, such liquid is collected into the drain pans 160 and/or 170 that reside below the belts 112 and 122. These liquids can be collected via drain ports of the drain pans 160 and/or 170, and sent to a compost compactor or hauled off as desired and/or required under applicable rules and guidelines. The waste material that is not removed or sorted out continues to the end of the second conveyor belt 122 where it is then discarded into a compactor or other waste bin that is subsequently hauled off to a composter or similar waste processor.

In general, the device 100 can be used for any type of material sorting application. For example, the device 100 can be used for a negative sort (the workers on the sides of the conveyor belts remove unwanted material), a positive sort (the workers on the sides of the conveyor belts removed wanted material), sorting between food waste and non-food waste, sorting between different types of food waste, sorting between different types of non-food waste (e.g., separating metal, plastic, fiber, cardboard, etc.), and other applications.

Alternative Implementations

Alternative Implementation 1. A device for sorting waste material, the device comprising: a first conveyance module including a first conveyor belt movably mounted thereon, the first conveyor belt having a first end and an opposing second end, the first conveyance module include a hopper disposed at the first end of the first conveyor belt, the hopper being configured to receive the waste material; a second conveyance module including a second conveyor belt movably mounted thereon, the second conveyor belt having a first end and an opposing second end, the second conveyance module being coupled to the first conveyance module such that the first end of the second conveyor belt is positioned adjacent to the second end of the first conveyor belt; a first drain pan disposed underneath the first end of the first conveyor belt and aligned with the hopper; and a second drain pan disposed underneath the second end of the first conveyor belt and the first end of the second conveyor belt.

Alternative Implementation 2. The device of Alternative Implementation 1, wherein the first conveyor belt is positioned at an angle such that the second end of the first conveyor belt is positioned higher than the first end of the first conveyor belt.

Alternative Implementation 3. The device of Alternative Implementation 2, wherein the angle of the first conveyor belt is adjustable.

Alternative Implementation 4. The device of Alternative Implementation 2 or Alternative Implementation 3, wherein the first end of the first conveyor belt is positioned at least partially underneath the hopper and the second end of the first conveyor belt is positioned above and spaced apart from the hopper.

Alternative Implementation 5. The device of any one of Alternative Implementations 1 to 4, wherein the second conveyor belt is positioned at an angle such that the second end of the second conveyor belt is positioned higher than the first end of the first conveyor belt.

Alternative Implementation 6. The device of Alternative Implementation 5, wherein the angle of the second conveyor belt is adjustable.

Alternative Implementation 7. The device of Alternative Implementation 5 or Alternative Implementation 6, wherein the first end of the second conveyor belt is positioned underneath the second end of the first conveyor belt and the second end of the second conveyor belt is positioned above and spaced apart from the second end of the first conveyor belt.

Alternative Implementation 8. The device of any one of Alternative Implementations 1 to 7, wherein the first conveyor belt is positioned at an angle such that liquid from the waste material on the first conveyor belt flows toward the first end of the first conveyor belt and into the first drain pan, and wherein the second conveyor belt is positioned at an angle such that liquid from the waste material on the second conveyor belt flows toward the first end of the second conveyor belt and into the second drain pan. In some cases, the angle of the first conveyor belt and/or the angle of the second conveyor belt are adjustable.

Alternative Implementation 9. The device of Alternative Implementation 8, wherein the first conveyor belt includes a pattern of raised ridges formed on a surface of the first conveyor belt, the pattern of raised ridges of the first conveyor belt directing the liquid on the first conveyor belt toward the first end of the first conveyor belt, and aiding in preventing the liquid on the first conveyor belt from spilling over at least a portion of side edges of the first conveyor belt.

Alternative Implementation 10. The device of Alternative Implementation 8 or Alternative Implementation 9, wherein the second conveyor belt includes a pattern of raised ridges formed on a surface of the second conveyor belt, the pattern of raised ridges of the second conveyor belt directing the liquid on the second conveyor belt toward the first end of the second conveyor belt, and aiding in preventing the liquid on the second conveyor belt from spilling over at least a portion of side edges of the second conveyor belt.

Alternative Implementation 11. The device of any one of Alternative Implementations 8 to 10, further comprising: a first set of legs coupled to the first conveyance module adjacent to the first end of the first conveyor belt; a second set of legs coupled to the first conveyance module adjacent to the second end of the first conveyor belt, and to the second conveyance module adjacent to the first end of the second conveyor belt; and a third set of legs coupled to the second conveyance module adjacent to the second end of the second conveyor belt, wherein a height of each respective set of legs is adjustable to adjust the angle of the first conveyor belt and the angle of the second conveyor belt.

Alternative Implementation 12. The device of Alternative Implementation 11, wherein the second drain pan is coupled to the second set of legs.

Alternative Implementation 13. The device of Alternative Implementation 11 or Alternative Implementation 12, wherein the height of the first set of legs is adjustable to adjust a height of the first end of the first conveyor belt relative to the second end of the first conveyor belt.

Alternative Implementation 14. The device of any one of Alternative Implementations 11 to 13, wherein the height of the second set of legs is adjustable to adjust a height of the second end of the first conveyor belt relative to the first end of the first conveyor belt, and to adjust a height of the first end of the second conveyor belt relative to the second end of the second conveyor belt.

Alternative Implementation 15. The device of any one of Alternative Implementations 11 to 14, wherein the height of the third set of legs is adjustable to adjust a height of the second end of the second conveyor belt relative to the first end of the second conveyor belt.

Alternative Implementation 16. The device of any one of Alternative Implementations 11 to 15, wherein each respective set of legs includes a pair of vertical support members extending downward from a respective end of one of the conveyor belts, a caster coupled to each of the pair of vertical support members, and a jack coupled to each of the pair of vertical support members, the jacks of each respective set of legs being operable to raise or lower the respective end of the conveyor belt from which the pair of vertical support members extend.

Alternative Implementation 17. The device of any one of Alternative Implementations 1 to 16, wherein the first drain pan is slidably coupled to the first conveyance module or to a set of legs coupled to the first conveyance module.

Alternative Implementation 18. The device of Alternative Implementation 17, wherein the first drain pan is movable between a stowed position and an extended position, the first drain pan in the stowed position being substantially underneath a front edge of the first conveyor belt and aligned with the hopper, the first drain pan in the extended position extending away from the front edge of the first conveyor belt such that the first drain pan is not aligned with the hopper.

Alternative Implementation 19. The device of Alternative Implementation 17 or Alternative Implementation 18, wherein the first drain pan includes a liquid reservoir and a grate mounted thereon configured to catch solid and semi-solid waste material that falls off the first end of the first conveyor belt.

Alternative Implementation 20. The device of any one of Alternative Implementations 1 to 19, wherein the first drain pan is coupled to the first conveyance module or to a set of legs coupled to the first conveyance module, and includes a liquid reservoir and a grate mounted thereon configured to catch solid and semi-solid waste material that falls off the first end of the first conveyor belt.

Alternative Implementation 21. The device of Alternative Implementation 20, wherein the grate is movable between a stowed position and an extended position, the grate in the stowed position being substantially underneath a front edge of the first conveyor belt and aligned with the hopper, the grate in the extended position extending away from the front edge of the first conveyor belt such that the grate is not aligned with the hopper.

Alternative Implementation 22. The device of any one of Alternative Implementations 1 to 21, wherein the first drain pan includes one or more drain ports out of which liquid in the first drain pan can flow.

Alternative Implementation 23. The device of any one of Alternative Implementations 1 to 22, wherein the second drain pan is slidably coupled to the first conveyance module, the second conveyance module, a set of legs that is coupled to the first conveyance module, a set of legs that is coupled to the second conveyance module, or any combination thereof.

Alternative Implementation 24. The device of Alternative Implementation 23, wherein the second drain pan is movable between a stowed position and an extended position, the second drain pan in the stowed position being substantially underneath a back edge of the first conveyor belt and a front edge of the second conveyor belt, the second drain pan in the extended position extending away from the back edge the first conveyor belt and toward the front edge of the first conveyor belt, or away from the front edge the second conveyor belt and toward a back edge of the first conveyor belt.

Alternative Implementation 25. The device of Alternative Implementation 24, wherein the second drain pan includes a liquid reservoir and a grate mounted thereon configured to catch solid and semi-solid waste material that falls off the second end of the first conveyor belt, the first end of the second conveyor belt, or both.

Alternative Implementation 26. The device of Alternative Implementation 25, wherein the grate is movable between a stowed position and an extended position, the grate in the stowed position being aligned with the second drain pan and substantially underneath the first conveyor belt, the second conveyor belt, or both, the grate in the extended position extending out from underneath the first conveyor belt, the second conveyor belt, or both.

Alternative Implementation 27. The device of any one of Alternative Implementations 1 to 26, wherein the second drain pan includes a liquid reservoir that is coupled to the first conveyance module or to a set of legs that is coupled to the first conveyance module.

Alternative Implementation 28. The device of any one of Alternative Implementations 1 to 27, wherein the second drain pan includes one or more drain ports out of which liquid in the second drain pan can flow.

Alternative Implementation 29. The device of any one of Alternative Implementations 1 to 28, further comprising a brush coupled to the second end of the first conveyor belt, the brush including a first set of bristles extending toward and contacting a bottom surface of the first conveyor belt, and a second set of bristles extending toward and contacting a top surface of the second conveyor belt.

Alternative Implementation 30. The device of any one of Alternative Implementations 1 to 29, further comprising a brush coupled to the hopper, the brush including a set of bristles extending toward and contacting a top surface of the first conveyor belt.

Alternative Implementation 31. The device of any one of Alternative Implementations 1 to 30, further comprising a waste leveling member disposed within the hopper, the waste leveling member leveling the waste material on the first conveyor belt as the first conveyor belt transports waste material through the hopper toward the second conveyor belt.

Alternative Implementation 32. The device of any one of Alternative Implementations 1 to 31, wherein the hopper includes: a front wall disposed adjacent to a front edge of the first end of the first conveyor belt; a first side wall disposed adjacent to a first side edge of the first end of the first conveyor belt; an opposing second side wall disposed adjacent to a second side edge of the first end of the first conveyor belt; and a back wall spaced apart from the front wall and extending between the first side wall and the second side wall, a bottom edge of the back wall being positioned above and spaced apart from a top surface of the first conveyor belt.

Alternative Implementation 33. The device of Alternative Implementation 32, further comprising a brush coupled to the bottom edge of the back wall of the hopper, the brush including a set of bristles extending toward and contacting the top surface of the first end of the first conveyor belt, such that waste material on the first conveyor belt within the hopper passes through the set of bristles toward the second end of the first conveyor belt.

Alternative Implementation 34. The device of Alternative Implementation 32 or Alternative Implementation 33, further comprising a waste leveling member disposed within the hopper, a bottom edge of the waste leveling member being positioned closer to the top surface of the first conveyor belt than the bottom edge of the back wall of the hopper.

Alternative Implementation 35. The device of Alternative Implementation 34, wherein the waste leveling member has an arc shape with an apex of the arc facing toward the second end of the first conveyor belt.

Alternative Implementation 36. The device of any one of Alternative Implementations 1 to 35, further comprising a third conveyance module including a third conveyor belt movably mounted thereon, the third conveyor belt having a first end that is coupled to the second conveyance module and a second end opposite the first end.

Alternative Implementation 37. The device of Alternative Implementation 36, further comprising a fourth conveyance module including a third conveyor belt movably mounted thereon.

Alternative Implementation 38. The device of Alternative Implementation 37, wherein the fourth conveyance module is coupled to the second conveyance module.

Alternative Implementation 39. The device of Alternative Implementation 37, wherein the fourth conveyance module is coupled to the third conveyance module.

These embodiments and obvious variations thereof is contemplated as falling within the spirit and scope of the claimed invention, which is set forth in the following claims. Moreover, the present concepts expressly include any and all combinations and subcombinations of the preceding elements and aspects.

I claim:

1. A device for sorting waste material, the device comprising:

a first conveyance module including a first conveyor belt movably mounted thereon, the first conveyor belt having a first end and an opposing second end, the first conveyance module include a hopper disposed at the first end of the first conveyor belt, the hopper being configured to receive the waste material;

a second conveyance module including a second conveyor belt movably mounted thereon, the second conveyor belt having a first end and an opposing second end, the second conveyance module being coupled to the first conveyance module such that the first end of the second conveyor belt is positioned adjacent to the second end of the first conveyor belt;

a first drain pan disposed underneath the first end of the first conveyor belt and aligned with the hopper;

a second drain pan disposed underneath the second end of the first conveyor belt and the first end of the second conveyor belt; and a waste leveling member disposed within the hopper of the first conveyance module, the waste leveling member having an arc shape with an apex of the arc facing toward the second end of the first conveyor belt.

2. The device of claim 1, wherein the first conveyor belt is positioned at an angle such that liquid from the waste material on the first conveyor belt flows toward the first end of the first conveyor belt and into the first drain pan, and wherein the second conveyor belt is positioned at an angle such that liquid from the waste material on the second conveyor belt flows toward the first end of the second conveyor belt and into the second drain pan.

3. The device of claim 2, wherein the first conveyor belt includes a pattern of raised ridges formed on a surface of the first conveyor belt, the pattern of raised ridges of the first conveyor belt directing the liquid on the first conveyor belt toward the first end of the first conveyor belt, and aiding in preventing the liquid on the first conveyor belt from spilling over at least a portion of side edges of the first conveyor belt.

4. The device of claim 2, wherein the second conveyor belt includes a pattern of raised ridges formed on a surface of the second conveyor belt, the pattern of raised ridges of the second conveyor belt directing the liquid on the second conveyor belt toward the first end of the second conveyor belt, and aiding in preventing the liquid on the second conveyor belt from spilling over at least a portion of side edges of the second conveyor belt.

5. The device of claim 2, wherein the angle of the first conveyor belt and the angle of the second conveyor belt are both adjustable.

6. The device of claim 2, further comprising:

a first set of legs coupled to the first conveyance module adjacent to the first end of the first conveyor belt;

a second set of legs coupled to the first conveyance module adjacent to the second end of the first conveyor belt, and to the second conveyance module adjacent to the first end of the second conveyor belt; and a third set of legs coupled to the second conveyance module adjacent to the second end of the second conveyor belt, wherein a height of each respective set of legs is adjustable to adjust the angle of the first conveyor belt and the angle of the second conveyor belt.

7. The device of claim 6, wherein:

the height of the first set of legs is adjustable to adjust a height of the first end of the first conveyor belt relative to the second end of the first conveyor belt;

the height of the second set of legs is adjustable to adjust a height of the second end of the first conveyor belt relative to the first end of the first conveyor belt, and to adjust a height of the first end of the second conveyor belt relative to the second end of the second conveyor belt; and the height of the third set of legs is adjustable to adjust a height of the second end of the second conveyor belt relative to the first end of the second conveyor belt.

8. The device of claim 6, wherein each respective set of legs includes a pair of vertical support members extending downward from a respective end of one of the conveyor belts, a caster coupled to each of the pair of vertical support members, and a jack coupled to each of the pair of vertical support members, the jacks of each respective set of legs being operable to raise or lower the respective end of the conveyor belt from which the pair of vertical support members extend.

9. The device of claim 1, wherein the first drain pan is slidably coupled to the first conveyance module or to a set of legs coupled to the first conveyance module.

10. The device of claim 1, wherein the first drain pan is coupled to the first conveyance module or to a set of legs coupled to the first conveyance module, and includes a liquid reservoir and a grate mounted thereon configured to catch solid and semi-solid waste material that falls off the first end of the first conveyor belt.

11. The device of claim 10, wherein the grate is movable between a stowed position and an extended position, the grate in the stowed position being substantially underneath a front edge of the first conveyor belt and aligned with the hopper, the grate in the extended position extending away from the front edge of the first conveyor belt such that the grate is not aligned with the hopper.

12. The device of claim 1, wherein the second drain pan is coupled to the first conveyance module, the second conveyance module, a set of legs that is coupled to the first conveyance module, a set of legs that is coupled to the second conveyance module, or any combination thereof.

13. The device of claim 12, wherein the second drain pan includes a liquid reservoir and a grate mounted thereon configured to catch solid and semi-solid waste material that falls off the second end of the first conveyor belt, the first end of the second conveyor belt, or both.

14. The device of claim 13, wherein the grate is movable between a stowed position and an extended position, the grate in the stowed position being aligned with the second drain pan and substantially underneath the first conveyor belt, the second conveyor belt, or both, the grate in the extended position extending out from underneath the first conveyor belt, the second conveyor belt, or both.

15. The device of claim 1, further comprising a brush coupled to the second end of the first conveyor belt, the brush including a first set of bristles extending toward and contacting a bottom surface of the first conveyor belt, and a second set of bristles extending toward and contacting a top surface of the second conveyor belt.

16. The device of claim 1, wherein the hopper includes:

a front wall disposed adjacent to a front edge of the first end of the first conveyor belt;

a first side wall disposed adjacent to a first side edge of the first end of the first conveyor belt;

an opposing second side wall disposed adjacent to a second side edge of the first end of the first conveyor belt; and a back wall spaced apart from the front wall and extending between the first side wall and the second side wall, a bottom edge of the back wall being positioned above and spaced apart from a top surface of the first conveyor belt.

17. The device of claim 16, further comprising a brush coupled to the bottom edge of the back wall of the hopper, the brush including a set of bristles extending toward and contacting the top surface of the first end of the first conveyor belt, such that waste material on the first conveyor belt within the hopper passes through the set of bristles toward the second end of the first conveyor belt.

18. The device of claim 16, wherein a bottom edge of the waste leveling member is positioned closer to the top surface of the first conveyor belt than the bottom edge of the back wall of the hopper.

19. The device of claim 18, wherein a position of the waste leveling member within the hopper is set to achieve a desired burden depth of the waste material outside the hopper.

20. A device for sorting waste material, the device comprising:

a first conveyance module including a first conveyor belt movably mounted thereon, the first conveyor belt having a first end and an opposing second end, the first conveyance module include a hopper disposed at the first end of the first conveyor belt, the hopper being configured to receive the waste material, wherein the hopper includes:

a front wall disposed adjacent to a front edge of the first end of the first conveyor belt;

a first side wall disposed adjacent to a first side edge of the first end of the first conveyor belt;

an opposing second side wall disposed adjacent to a second side edge of the first end of the first conveyor belt; and a back wall spaced apart from the front wall and extending between the first side wall and the second side wall, a bottom edge of the back wall being positioned above and spaced apart from a top surface of the first conveyor belt, a second conveyance module including a second conveyor belt movably mounted thereon, the second conveyor belt having a first end and an opposing second end, the second conveyance module being coupled to the first conveyance module such that the first end of the second conveyor belt is positioned adjacent to the second end of the first conveyor belt;

a first drain pan disposed underneath the first end of the first conveyor belt and aligned with the hopper;

a second drain pan disposed underneath the second end of the first conveyor belt and the first end of the second conveyor belt; and a waste leveling member disposed within the hopper, a bottom edge of the waste leveling member being positioned closer to the top surface of the first conveyor belt than the bottom edge of the back wall of the hopper, the waste leveling member having an arc shape with an apex of the arc facing toward the second end of the first conveyor belt.

* * * * *